UNITED STATES PATENT OFFICE 2,378,834

PRIMARY AROMATIC AMINE ALDEHYDE RESIN, PRODUCTS, AND METHODS OF MAKING THE SAME

Loring Coes, Jr., Brookfield, Mass., assignor to Norton Company, Worcester, Mass., a corporation of Massachusetts No Drawing. Application July 23, 1942, Serial No. 452,095

7 Claims. (Cl. 260—72)

This invention relates to resins and more particularly to the polymerized condensation product of a primary aromatic amine with formaldehyde.

One object of the invention is to provide a reagent which hardens or converts to an infusible condition a primary aromatic amine formaldehyde resin and particularly an aniline formaldehyde resin.

Another object of the invention is to provide a hardening agent for such resins which during the heat conversion stage will not react to form water and cause distortion of the resin body.

Another object of the invention is to provide a method of making a final resin product, or an intermediate product capable of producing the same, whereby a primary aromatic amine formaldehyde resin may be materially hardened.

Another object is to provide a method of this type wherein a resin or a mixture of the resin with granular material or a suitable filler may be cold-molded and the molded object thereafter heat cured while not confined under pressure.

Another object is to provide a method of making molded objects, with or without granular material, with the aid of an agent serving as a wettant and a plasticizer for a primary aromatic amine formaldehyde resin prior to heat hardening and which ultimately acts as a hardening and cross linking agent for the resin without producing water during the hardening stage or causing distortion of the formed body. Other objects will be in part obvious or in part pointed out hereinafter.

The invention accordingly consists in the compositions and products and in the several steps and relation and order of each of said steps to one or more of the others thereof, all as will be illustratively described herein, and the scope of the application of which will be indicated in the following claims.

I provide a quantity of a primary aromatic amine, such as aniline, ortho, meta or para toluidine, or diamino diphenyl methane; and a quantity of formaldehyde. I may optionally provide a quantity of one or more organic compounds containing a halogen selected from the group consisting of chlorine, bromine and iodine and capable of splitting off hydrogen halide at elevated temperatures and/or of alkylating an aromatic amine polymer, providing cross links connecting amine groups of the chains. The aromatic amine which I now prefer to use is aniline. Aniline

or one of the other aromatic amines mentioned, or mixtures of two or more of such amines, is reacted with formaldehyde HCHO in the presence of a strong acid to produce a long chain polymer which, when an excess of formaldehyde above the stoichiometric proportions is used, for example, 20% excess, has adjacent chains connected with methylene —CH$_2$— groups to form a tough, heat resistant, semi-thermoplastic resin. I may add some of the formaldehyde after the initial condensation, in the form of paraformaldehyde, or by the addition of hexa-methylene-tetramine.

As examples of the halogenated organic compound, I may use any of polyvinyl chloride, polyvinylidene dichloride, rubber hydrochloride, chlorinated rubber, chlorinated polyisobutylene; any chlorine, bromine or iodine substituted paraffine hydrocarbon, such as hexa chlor ethane, tetra chlor pentane, 1, 2, diiodo ethane, beta butylene bromide, partly chlorinated eicosane, or any aliphatic halohydrin of not more than six carbon atoms, such as any of the amylene chlorhydrins; propylene chlorhydrin; any of the butylene chlorhydrins; ethylene chlorhydrin, ethylene bromhydrin, or glycerol alpha gamma dichlorhydrin. Naturally enough, most of the examples are chlorinated compounds because these are cheaper and more readily available than the brominated or iodated compounds, but the latter two give effective results. The fluorinated compounds are rejected because they are too stable and will not alkylate the polymer. However, so far as the broad features of this invention are concerned, and apart from the esters hereinafter described, the above mentioned halogenated organic compound may be omitted altogether.

Since one aspect of the invention relates to grinding wheels and other solid abrasive compositions and articles, I may also provide a quantity of abrasive grain. Any abrasive grain may be used, for example, any of the varieties of alumina, such as emery, corundum, dence "regular" fused alumina, porous white fused alumina; silicon carbide and other hard carbides; quartz; glass; garnet; or diamonds. Two or more of these abrasives may be mixed, if desired.

Manufacturers usually prefer to use the dry granular mix method, with the cold press and the oven to make organic bonded grinding wheels because this combination of steps and features is the cheapest to carry out and, furthermore, generally gives uniform results. In the dry granular mix method the abrasive grains are placed in a mixing pan and are then wet with a suitable liquid; then powdered fusible resin is added, mixing is done to coat each granule with some of the powder and to leave a minimum of loose powder, then a mold is charged with the "dry granular mix" thus produced, the top plate is inserted, the mold is "closed" by means of an hydraulic press, the mold is then "stripped," the "green" wheel is taken to an oven and (at the same time as hundreds or thousands of others of varying sizes, shapes and compositions) it is cured to make the final composition and, after "truing" or "shaving," the final article. This method, in contradistinction to the use of the hot press with or without the autoclave and vice versa, has the advantage that ordinary ovens, in which thousands of "green" wheels can be stacked, are used; the hydraulic press is tied up by a given wheel for thirty seconds instead of thirty minutes, and the press need have no heated platens. This wetting of the abrasive grains by a liquid is called "plasticizing." It is preferred that the wettant be a solvent for the resin.

In the commercial manufacture of aniline-formaldehyde resin bonded grinding wheels and other solid abrasive products, only furfural has been used as this plasticizer-wettant. (Other aromatic-amine-aldehyde polymers have not been used commercially for the manufacture of grinding wheels and other solid abrasive products so far as I am aware). The furfural cross links the polymer and, therefore, converts it to the "infusible" condition. A stoichiometric quantity of aniline and formaldehyde condensed in the presence of a strong acid is believed to produce a resin which is structurally represented thus:

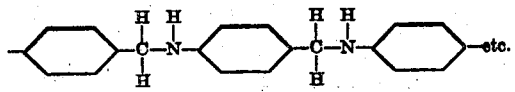

Such a resin cross-linked with furfural is believed to be represented thus:

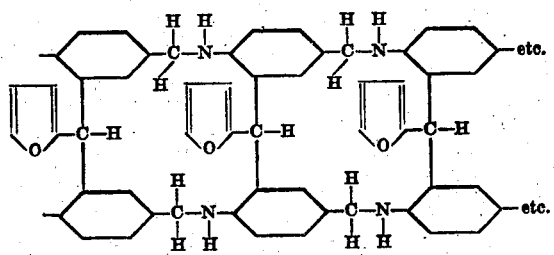

In accordance with my invention, I propose to harden a primary aromatic amine formaldehyde resin by means of the tri-monochloracetates of certain trihydric alcohols which are capable, under suitable heat treatment, of alkylating and cross linking the resin. The preferred esters for accomplishing this purpose are glycerol tri-monochloracetate and tri-methylol propane tri-monochloracetate, or mixtures thereof. These esters may be used either with or without the above-mentioned halogenated organic compounds and with or without abrasive granular material or suitable fillers. Suitable wettant plasticizers, such as furfural, may also be used; but I prefer to use these alkylating and cross linking esters alone for the purpose of hardening the resin, since these hardening agents are capable of initially wetting and plasticizing a green mixture of the resin and any suitable granular or filler material and will thereby aid in the molding operation before they are reacted with the resin to alkylate and cross link the same.

The formula for glycerol tri-monochloracetate may be written as:

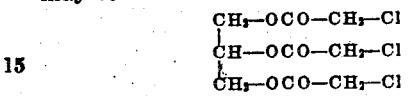

I believe it cross-links the aniline-formaldehyde polymer thus:

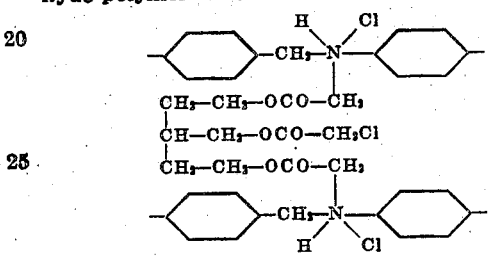

Tri-methylol propane tri-monochloracetate is written thus:

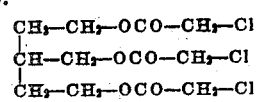

It will thus be seen that it is definitely related to glycol tri-monochloracetate, and this relationship appears also from the manner in which it cross-links with the aniline formaldehyde polymer, as follows:

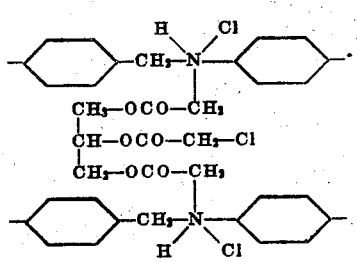

Thus, I may use either of the two esters or a mixture of both.

It will be noted that chlorine now appears in the amino group. When a grinding wheel according to the invention is used to grind, the heat generated by grinding (which may reach 500° C. or more and is a higher heat than generated in most sanding operations with sandpaper or the like) releases hydrogen chloride at the grinding line which appears to have a pronounced effect upon the grinding operation, preventing or at least minimizing "loading" and assisting in the cutting action by making the metal chips more brittle.

Wheels or other abrasive articles made according to the invention thus have certain structural and functional advantages and, according to my invention, methods of making them achieve still further advantages in that, for example, it is possible to avoid, when desired, having to simultaneously mold or press and heat-treat them, as in a hot press, and hence I do not have to tie up expensive hot-press equipment.

My invention, however, consists also in the discovery that these two esters will serve as plasticizers and solvents for the resin in the green stage and thereby aid in the molding operation as well as serving as hardening agents for the primary amine formaldehyde resin, for thereby I am enabled, with or without fillers, to produce a strong, tough and durable resin which, in its intermediate stage, can be readily and inexpensively molded or otherwise given desired configuration or shape according to the article to be made up, and inexpensively cured, as is well illustrated in the examples later herein given in the making up of an abrasive article; but it is to be understood that, where employed in the making of an abrasive article, I am enabled to achieve distinct advantages and improved intermediate and final results. For example, the ester is a good wetting agent for the abrasive grain, and this makes for achieving uniform coverage of each grain by the particles of the powdered resin, the wetting agent, in wetting the surfaces of the grains uniformly, thus providing a means for holding the resin powder particles to the grain surfaces somewhat like a uniform coating, and yet functioning subsequently as a hardening agent for the resin during the curing. Moreover, these esters bring hydrogen chloride into the polymer as above pointed out and do so in a manner to facilitate the freeing of the hydrogen chloride at the grinding line, under the action of the heat which is there produced during grinding.

Furthermore, insofar as I am aware, the esters are new compositions of matter and hence, before setting forth illustrative examples of my methods of employing them for such purposes as those mentioned above, an illustrative or preferred manner of producing them may first be set forth.

I first heat 3 mols of chloracetic acid and 1 mol of the trihydric alcohol (glycerine in the one case, and tri-methylol propane in the other case) at a temperature of from 100° C. to 150° C., in an open flask until the acid number of the mixture is reduced to zero or nearly so. The reaction mixture is then neutralized with sodium carbonate, washed with water and the ester is then dried over sodium sulphate. The ester may then be heated for from 2 to 4 hours at about 100° C., at reduced pressure, say, of 20 millimeters, thus to remove volatile impurities. The esters prepared in this way are liquids and are sufficiently pure for the purposes of my invention.

Having thus set forth an illustrative manner of producing the esters, I may use either of them, or a mixture of them, in various ways of which the following two examples are illustrative of the various aspects of my invention, even though the examples are of the making of grinding wheels.

Example I 500 grams of #46 grit "Alundum" abrasive grain is wet with 25 cc. of glycerol tri-monochloracetate, and thereto is then added 165 grams of a mixture comprising, by volume, 65% of aniline formaldehyde resin, 30% of cryolite, and 5% of soluble anhydrite, under thorough mixing or stirring, thus producing a "dry granular mix." The latter is then spread in a 6" mold and pressed to a pore volume of 20%, and these steps may be performed with the mix cold or at room temperature. The "green" wheel is then stripped from the mold and heat-treated.

Heat treatment may be by way of an oven in which the temperature is raised gradually over a 4-hour period from an initial temperature of about 100° C. to a temperature of 175° C., whence the wheel is kept for about 2 hours at the latter temperature, and then is cooled off.

Example II 1050 grams of #80 grit "Alundum" abrasive grain, 330 grams of a mixture consisting, by volume, of 65% of aniline formaldehyde resin, 30% of cryolite, and 5% of soluble anhydrite, and 55 cc. of tri-methylol propane tri-monochloracetate are thoroughly mixed together and worked on differential mixing rolls until a uniform sheet is obtained whence the sheet is rolled out in a calender roll to give the desired compactness and thickness, a thickness, in the present instance, of $3/32$". From the sheet a 12" disk is cut, thus forming a "green" wheel which is then heat-treated and hence cured, preferably in the manner set forth in Example I.

In each of the above examples, there may be substituted in similar proportions, the other of the two than the one specifically mentioned, or mixtures of the two. The wheels thus made, upon test, are of good efficiency and in general have physical characteristics somewhat like those of a rubber-bonded grinding wheel, making them particularly suitable for use where the rubber-bonded grinding wheel is particularly useful or is preferred or required.

According to certain prior practices, difficulties are encountered during heat treatment or curing, due to the fact that swelling occurs; such swelling usually results from the formation of water and is aggravated by the conversion of water or possibly also of other constituents into vapors, under action of the heat treatment. But according to my invention such disadvantages and defects are successfully overcome and I find that, in practicing my invention, no such swelling occurs; this is due to the fact that no water or other liquid or vapors thereof, as would cause swelling, during the heat treatment or curing, are formed.

I make no claim herein to abrasive wheels or abrasive articles or to the method of making the same since the subject matter thereof is claimed in my copending Patent No. 2,319,794 of May 25, 1943.

It will thus be seen that there has been provided by this invention, an article, a composition and a method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. An intermediate product that is moldable and capable of being set or hardened under heat treatment comprising a primary aromatic amine formaldehyde resin and a hardening agent therefor that comprises a compound selected from the group consisting of glycerol tri-monochloracetate and tri-methylol propane tri-monochloracetate.

2. A resinous product comprising a primary aromatic amine formaldehyde resin cross linked by a hardening agent comprising essentially a compound selected from the group consisting of glycerol tri-monochloracetate and tri-methylol propane tri-monochloracetate.

3. A resinous product comprising aniline formaldehyde resin cross linked by a hardening agent comprising essentially a compound selected from the group consisting of glycerol tri-monochloracetate and tri-methylol propane tri-monochloracetate.

4. The method of making a moldable, heat settable intermediate product which comprises the steps of adding to and mixing with a primary aromatic amine formaldehyde resin an alkylating and cross linking agent comprising essentially a compound selected from the group consisting of glycerol tri-monochloracetate and tri-methylol propane tri-monochloracetate.

5. The method of making a resinous product comprising the steps of mixing a primary aromatic amine formaldehyde resin with a hardening agent comprising essentially an alkylating and cross linking agent selected from the group consisting of glycerol tri-monochloracetate and tri-methylol propane tri-monochloracetate, shaping the mixture to a desired configuration and thereafter heating the mass to cause said agent to react with and harden the resin.

6. The method of making a resinous product which comprises the steps of mixing aniline formaldehyde resin with a hardening agent comprising essentially an alkylating and cross linking agent selected from the group consisting of glycerol tri-monochloracetate and tri-methylol propane tri-monochloracetate, shaping the mixture to a desired configuration and thereafter heating the mass to cause said agent to react with and harden the resin.

7. The method of making a resinous product which comprises the steps of making a mixture containing aniline formaldehyde resin and a hardening agent comprising essentially an alkylating and cross linking agent selected from the group consisting of glycerol tri-monochloracetate and tri-methylol propane tri-monochloracetate, cold molding the mass to a desired shape and thereafter heating the molded mass to cause said agent to react with and cross link the resin.

LORING COES, Jr.